United States Patent
Patil et al.

(10) Patent No.: US 9,544,365 B2
(45) Date of Patent: *Jan. 10, 2017

(54) MOBILE DEVICE WORKLOAD MANAGEMENT FOR CLOUD COMPUTING USING SIP AND PRESENCE TO CONTROL WORKLOAD AND METHOD THEREOF

(71) Applicant: INTERNATIONAL BUSINESS MACHINES CORPORATION, Armonk, NY (US)

(72) Inventors: Sandeep R. Patil, Pune (IN); Sri Ramanathan, Lutz, FL (US); Susan L. Sylvia, El Dorado Hills, CA (US); Matthew B. Trevathan, Roswell, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/061,125

(22) Filed: Mar. 4, 2016

(65) Prior Publication Data

US 2016/0191616 A1   Jun. 30, 2016

Related U.S. Application Data

(63) Continuation of application No. 14/802,262, filed on Jul. 17, 2015, now Pat. No. 9,307,016, which is a
(Continued)

(51) Int. Cl.
*H04L 29/08* (2006.01)
*H04W 60/00* (2009.01)
(Continued)

(52) U.S. Cl.
CPC ......... *H04L 67/1002* (2013.01); *G06F 9/5027* (2013.01); *G06F 9/5072* (2013.01);
(Continued)

(58) Field of Classification Search
CPC .. H04L 67/10; H04L 65/1059; H04L 65/1006; H04L 65/1016
See application file for complete search history.

(56) References Cited

U.S. PATENT DOCUMENTS 6,496,871 B1   12/2002   Jagannathan et al.
6,925,644 B2   8/2005    Waldo et al.
(Continued)

FOREIGN PATENT DOCUMENTS

WO   03015326     2/2003
WO   2008066277   6/2008

OTHER PUBLICATIONS

A Survey on Wireless Grids and Clouds This paper appears in: Grid and Cooperative Computing, 2009. GCC '09. Eighth International Conference on Date of Conference: Aug. 27-29, 2009 Author{s): Gang Li Inst. of Comput. Technol., D Chinese Acad. of Sci., Beijing, China Hongmei Sun; Huahao Gao; Haiyan Yu; Yue Cai on pp. 261-267.
(Continued)

*Primary Examiner* — Jimmy H Tran
(74) *Attorney, Agent, or Firm* — Christopher McLane; Andrew M. Calderon; Roberts Mlotkowski Safran, Cole & Calderon, P.C.

(57) ABSTRACT

A method is implemented in a computer infrastructure having computer executable code tangibly embodied on a computer readable storage medium having programming instructions. The programming instructions are operable to
(Continued)

manage workload for cloud computing by transferring workload to at least one mobile device using Session Initiation Protocol (SIP).

15 Claims, 4 Drawing Sheets

Related U.S. Application Data continuation of application No. 14/329,032, filed on Jul. 11, 2014, now Pat. No. 9,160,788, which is a continuation of application No. 12/782,142, filed on May 18, 2010, now Pat. No. 8,825,731.

(51) Int. Cl.
  *H04L 29/06* (2006.01)
  *G06F 9/50* (2006.01)
  *H04L 12/911* (2013.01)

(52) U.S. Cl.
  CPC .......... *G06F 9/5083* (2013.01); *H04L 47/827* (2013.01); *H04L 65/1006* (2013.01); *H04L 65/1016* (2013.01); *H04L 65/1059* (2013.01); *H04L 65/1073* (2013.01); *H04L 67/10* (2013.01); *H04W 60/00* (2013.01)

(56) References Cited

U.S. PATENT DOCUMENTS

| | | | |
|---|---|---|---|
| 7,515,899 | B1 | 4/2009 | Carr et al. |
| 7,543,003 | B2 | 6/2009 | Shukla et al. |
| 7,870,044 | B2 | 1/2011 | Robertson |
| 7,941,518 | B2 | 5/2011 | Kim |
| 7,990,900 | B2 | 8/2011 | Pattabhiraman et al. |
| 8,112,479 | B2 | 2/2012 | Guan |
| 8,296,765 | B2 | 10/2012 | Kurdi |
| 8,364,758 | B2 | 1/2013 | Hydrie et al. |
| 8,416,781 | B2 | 4/2013 | Shatsky et al. |
| 8,433,815 | B2 | 4/2013 | van Coppenolle et al. |
| 8,632,411 | B1 | 1/2014 | Kem |
| 8,793,313 | B2 | 7/2014 | Kem et al. |
| 8,793,478 | B2 * | 7/2014 | Jaber ................. G06F 9/5072 713/2 |
| 8,795,086 | B2 | 8/2014 | Rudi et al. |
| 8,935,366 | B2 | 1/2015 | Mehr et al. |
| 2002/0128001 | A1 | 9/2002 | Shuttleworth |
| 2003/0115374 | A1 | 6/2003 | Waldo et al. |
| 2004/0015569 | A1 | 1/2004 | Lonnfors et al. |
| 2004/0030614 | A1 | 2/2004 | Shields et al. |
| 2004/0103157 | A1 | 5/2004 | Requena et al. |
| 2004/0117454 | A1 * | 6/2004 | Koont ................. G06F 15/025 709/213 |
| 2005/0170861 | A1 | 8/2005 | Niemi et al. |
| 2005/0216593 | A1 | 9/2005 | Kotar |
| 2006/0031509 | A1 | 2/2006 | Ballette et al. |
| 2007/0050392 | A1 | 3/2007 | Pattabhiraman et al. |
| 2007/0153709 | A1 | 7/2007 | Choi |
| 2007/0288621 | A1 | 12/2007 | Gundu et al. |
| 2008/0162637 | A1 | 7/2008 | Adamczyk et al. |
| 2008/0250408 | A1 | 10/2008 | Tsui et al. |
| 2009/0122973 | A1 | 5/2009 | Jay et al. |
| 2009/0171855 | A1 | 7/2009 | Hubbard |
| 2009/0239502 | A1 * | 9/2009 | Dempo ................. H04L 12/4011 455/411 |
| 2009/0265473 | A1 | 10/2009 | Hydrie et al. |
| 2010/0049846 | A1 | 2/2010 | Ballette et al. |
| 2010/0077069 | A1 | 3/2010 | Kim |
| 2010/0248698 | A1 | 9/2010 | In et al. |
| 2010/0281095 | A1 | 11/2010 | Wehner et al. |
| 2010/0312901 | A1 * | 12/2010 | Noyranen ......... H04L 29/12509 709/228 |
| 2011/0055399 | A1 | 3/2011 | Tung et al. |
| 2011/0103373 | A1 | 5/2011 | Shatsky et al. |
| 2011/0153812 | A1 | 6/2011 | Yoon et al. |
| 2011/0213896 | A1 | 9/2011 | Merino Vazquez et al. |
| 2011/0235592 | A1 | 9/2011 | Hoefel et al. |
| 2012/0036270 | A1 | 2/2012 | Escribano Bullon et al. |
| 2012/0268061 | A1 | 10/2012 | Bhageria et al. |
| 2014/0047526 | A1 | 2/2014 | Huang |

OTHER PUBLICATIONS

Hyrax: Cloud Computing on Mobile Devices using MapReduce: Eugene E. Marinelli; CMU-CS-09-164- Sep. D 2009; School of Computer Science Carnegie Mellon University Pittsburgh, PA 15213.
RFC 3863—Presence Information Data Format (PIDF).
Heikkinen et al., "Technology Evolution of Mobile Peer-to-Peer Communications", Digital Object Identifier, 2008 (9 pages).
Disclosed Anonymously, "Use of neural Networking Techniques in Load Curtailment Applications", IP Prior Art Database, Mar. 3, 2006 (3 pages).
Acharya et al., "A Programmable Message Classification Engine for Session Initiation Protocol {SIP)", ANCS '07, pp. 185-194.
Misra et al., "Information-Theory Based Optimal Location Wirelss Networks", IEEE, vol. 16, No. 3, Jun. 2008, pp. 525-538.

* cited by examiner

MOBILE DEVICE WORKLOAD MANAGEMENT FOR CLOUD COMPUTING USING SIP AND PRESENCE TO CONTROL WORKLOAD AND METHOD THEREOF

FIELD OF THE INVENTION

The present invention generally relates to a system and method of workload management for cloud computing using SIP and presence and, more particularly, a system and method of mobile device workload management for cloud computing using SIP and presence to control workload and method thereof.

BACKGROUND

Cloud computing is a means of providing service delivery for consumer and business needs in a simplified way, providing unbounded scale and differentiated quality of service. Businesses are looking to cloud computing to foster rapid innovation and decision making, for the agility needed to respond quickly in today's highly competitive environment, to reduce capital and operational costs, and an environment that scales easily to effectively meet customer needs.

Cloud computing enables organizations to provide reliable, on-demand services in a flexible and affordable manner offering the benefits of open standards, scalable systems and service oriented architecture. With these benefits also come new complexities that must be properly managed. These complexities include, for example, Rapid growth of virtualized resources across multiple environments;

Relationship of virtualized resources to underlying physical infrastructure; and Health monitoring and problem determination across a physical and virtualized infrastructure.

In particular, cloud computing is a way of computing, via the Internet, that broadly shares computer resources instead of using software or storage on a local PC. Typical cloud computing providers deliver common business applications online which are accessed from a web browser on a personal computer, while the software and data are stored on servers. This is a constraint of the current paradigm of cloud computing infrastructure which consists of reliable services delivered through data centers and built on servers which perform the processing requirements, to be accessed by the web browser, for example, on a personal computer.

In general, cloud computing customers do not own the physical infrastructure, instead avoiding capital expenditure by renting usage from a third-party provider. They consume resources as a service and pay only for resources that they use. This, though, requires a server layer which consists of computer hardware and/or computer software products that are specifically designed for the delivery of cloud services, including multi-core processors, cloud-specific operating systems and combined offerings. During heavy workloads or demand, this can place a strain on the servers, slowing services.

Accordingly, there exists a need in the art to overcome the deficiencies and limitations described herein above.

BRIEF SUMMARY

In a first aspect of the invention, a method is implemented in a computer infrastructure having computer executable code tangibly embodied on a computer readable storage medium having programming instructions. The programming instructions are operable to manage workload for cloud computing by transferring workload to at least one mobile device using Session Initiation Protocol (SIP).

In another aspect of the invention, a method is implemented on a computer infrastructure having hardware. The method comprises: receiving registration information of a mobile device using SIP registration; sending a workload request to the mobile device based on the registration; and providing computing work to the mobile device from a content cache associated with a cloud fabric, based on the workload request, for assisting in cloud computing.

In an additional aspect of the invention, a computer program product comprising a computer usable storage medium having readable program code embodied in the medium is provided. The computer program product includes at least one component operable to: provision a network as an SIP device in an Home Subscriber Server (HSS) and IP Multimedia Subsystem (IMS) network; pre-provision a content service with specific context and data that cloud clients require; provision a cloud fabric with details of the mobile device; and provision the mobile device with a lightweight presence client that can use an IMS stack found on mobile platforms.

In a further aspect of the invention, a computer system for provisioning components. The system comprises a CPU, a computer readable memory and a computer readable storage media. Additionally, the system comprises: first program instructions to provision a network as an SIP device in a Home Subscriber Server (HSS) and IP Multimedia Subsystem (IMS) network; second program instructions to pre-provision a content service with specific context and data that cloud clients require; third program instructions to provision a cloud fabric with details of the mobile device; and fourth program instructions to provision the mobile device with a lightweight presence client that can use an IMS stack found on mobile platforms. The program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
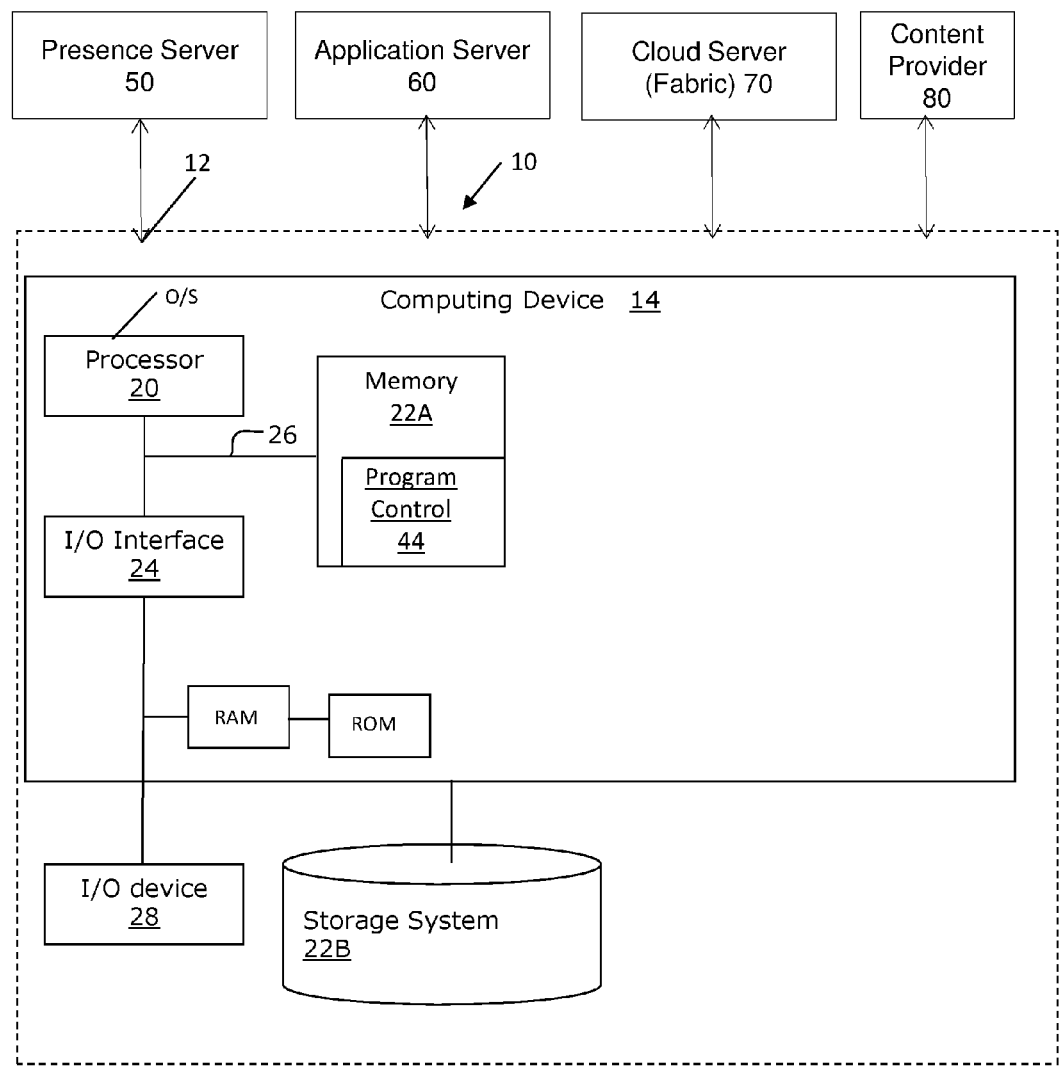
FIG. 1 an illustrative environment for implementing the steps in accordance with aspects of the invention.

The present invention generally relates to a system and method of workload management for cloud computing using Session Initiation Protocol (SIP) and presence and, more particularly, to a system and method of mobile device workload management for cloud computing using SIP and presence to control workload and method thereof. More specifically, the present invention provides significant opportunities for increasing the efficiency of clouds by allowing for adhoc leveraging of computing power in nodes that are not formally part of the cloud already.

SIP is a signaling protocol used for controlling multimedia communication sessions such as voice and video calls over Internet Protocol (IP). The protocol can be used for creating, modifying and terminating two-party (unicast) or multiparty (multicast) sessions consisting of one or several media streams. Other application examples include video conferencing, streaming multimedia distribution, instant messaging, and presence information. The SIP protocol is a TCP/IP-based Application Layer protocol. SIP is designed to be independent of the underlying transport layer; it can run on Transmission Control Protocol (TCP), User Datagram Protocol (UDP), or Stream Control Transmission Protocol (SCTP).

In embodiments, the system and method of the present invention allows for clouds to use telecommunications based signaling to use SIP to transfer workloads to mobile devices (e.g., 2G mobile devices, 3G devices, netbooks, etc.) that are tethered to networks in an intermittently or constantly connected fashion. For example, in implementation, the present invention can add a mobile device to a public or private cloud. The present invention can send work to the mobile device and then dissociate the mobile device from the cloud by leveraging IMS network based SIP signaling. Thus, in embodiments, the present invention leverages SIP based signaling to bring mobile endpoints into clouds or dissociate the mobile devices. In additional embodiments, the present invention supports an intensive location compute or 3D compute where data is not on the cloud, but on the mobile device or other third party device.

The IMS reference architecture is a standard in many mobile (and fixed) telecommunications' devices. Wireless networks are also rapidly improving, allowing for the easy download and upload of significant amounts of data to the mobile device. In addition, handsets (hereinafter referred generally as mobile devices) are significantly improving in order to facilitate the present invention. For example, mobile devices are exhibiting significantly more processing power by using higher end processors from specialized mobile device vendors that permit active multi-tasking, while still continuing to optimize battery life. In addition, mobile devices have significant memory capabilities, and improved battery life allowing for more efficient computing to continue for longer periods of time. Mobile devices include radios for high speed data (e.g., EVDO variants, Wimax (802.16e), Wifi (802.11x), LTE, in addition to on board Assisted GPS chipsets allowing for location based computing to occur locally.

In addition, chipsets being used in the next generation mobile devices are the same as those being used for much more powerful netbooks and other computing devices. Also, there is a significant increase in IMS networks, leveraging SIP client stacks that are being bundled by the mobile device vendor. It is also known that in any 24 hour cycle, mobile devices have long periods where they essentially are idle and will have compute cycles available, but have largely been hitherto ignored and unutilized. Also, the RPID and PIDF formats in presence servers can be logically extended to include multiple additional elements as described herein, in addition to the fact that large slices of time remain when mobile devices are turned off and charging without being used on active data sessions or voice calls (e.g., during night time).

In view of the above, the present invention focuses on delivering priority on a call by call basis using callee controlled white-lists, allowing for the required privacy in implementing such a solution. The present invention also works across IP as well as SS7 and existing telecommunications networks, in addition to factoring in location and time of day intervals to determine and provide priority to the mobile devices for management of workload on a computing cloud. The present invention also uses a feature code based approach for IN (Intelligent Network) infrastructure, and fosters IMS based backplanes as it leverages SIP based signaling to bring mobile endpoints into clouds and dissociate from the clouds. The present invention also suits and scales cloud offerings which essentially have unique characteristic and differ from traditional grids.

The present invention also provides infrastructure extensions, inclusive of a lightweight presence enabled cloud client, that allows for a mobile device to be added to a public or private cloud, which can send work (e.g., workload management) to the mobile device and then dissociate the mobile device from the cloud by leveraging IMS network based SIP signaling. Additionally, the use of a network housed presence server is provided as a set of trigger points to initiate interactions between the cloud and the mobile device.

The present invention also accounts for a growing (but yet unnoticed) trend of high powered mobile devices, which essentially sit idle for a large amounts of time, and allows for these devices to become adhoc participants in cloud infrastructures. For example, in implementation, the idle mobile devices may be used to process data for the cloud. This is accomplished using SIP signaling semantics (which is used for setting up, controlling and dismantling media rich communications sessions only).

In addition, the present invention effectively leverages future migration, by leveraging SIP based signaling to bring mobile endpoints into clouds and dissociate using SIP based signaling. The costs savings associated with using the present invention is significant given the exploding number of high power mobile form factors in the market and the fact that significant amount of the day exists where these devices are largely idle. Several applications also exist where workload can be offloaded from the cloud for dissociated processing which is supported by the present invention.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk, a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any storage medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein in a cloud environment. In embodiments, the server can be a "cloud" server, which allows processing to be performed by a mobile device as discussed herein. In embodiments, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, mobile device, keyboard etc.

In general, the processor 20 executes computer program code (e.g., program control 44), which can be stored in the memory 22A and/or storage system 22B. Moreover, in accordance with aspects of the invention, the program control 44 can implement the processes of the present invention. The processor 20 can be implemented as one or more program code in the program control 44 stored in memory 22A as separate or combined modules. Additionally, processor 20 may be implemented as separate dedicated processors or a single or several processors to provide the function of the present invention. A processor can also be resident or part of a presence server (A/S)/IMS network 50, application server 60, or content provider 80 for example.

In implementation, a mobile device (external I/O device/resource 28) registers with network (e.g., server) 10 using standard IMS semantics via a SIP registration, as well as registering with the presence server A/S 50 as a client. The mobile device can also register as a watcher for incoming cloud changes. The device information is sent to a cloud fabric 70 (which may be associated with or completely resident on the server) by the presence server A/S 50. The cloud processes this information to use as a basis for future decisions. The cloud fabric 70 sends a workload request to the mobile device, which is sent in the form of a presence notification to the mobile device. The mobile device performs computing work after downloading anything it may need from the content cache, from the content provider 80. Upon termination or conclusion, results go back to the cloud fabric, and the cloud fabric may initiate dissociation of the mobile device. It should be understood by those of skill in the art that, in embodiments, the presence server (A/S)/IMS network 50, application server 60, or content provider 80, for example, may be represented by or resident on the server 10.

In this way, the present invention leverages the IMS infrastructure in the evolving network domain in a unique way to support cloud computing. The present invention also provides a highly feasible, low cost of implementation to integrate mobile devices into the cloud, using presence as an indicator of a mobile devices ability to accept workload. The use of presence in determining if a mobile device has entered or left the cloud also allows the cloud fabric the ability to resend work to available nodes of a mobile device as it becomes disconnected.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagram

Figure 2:
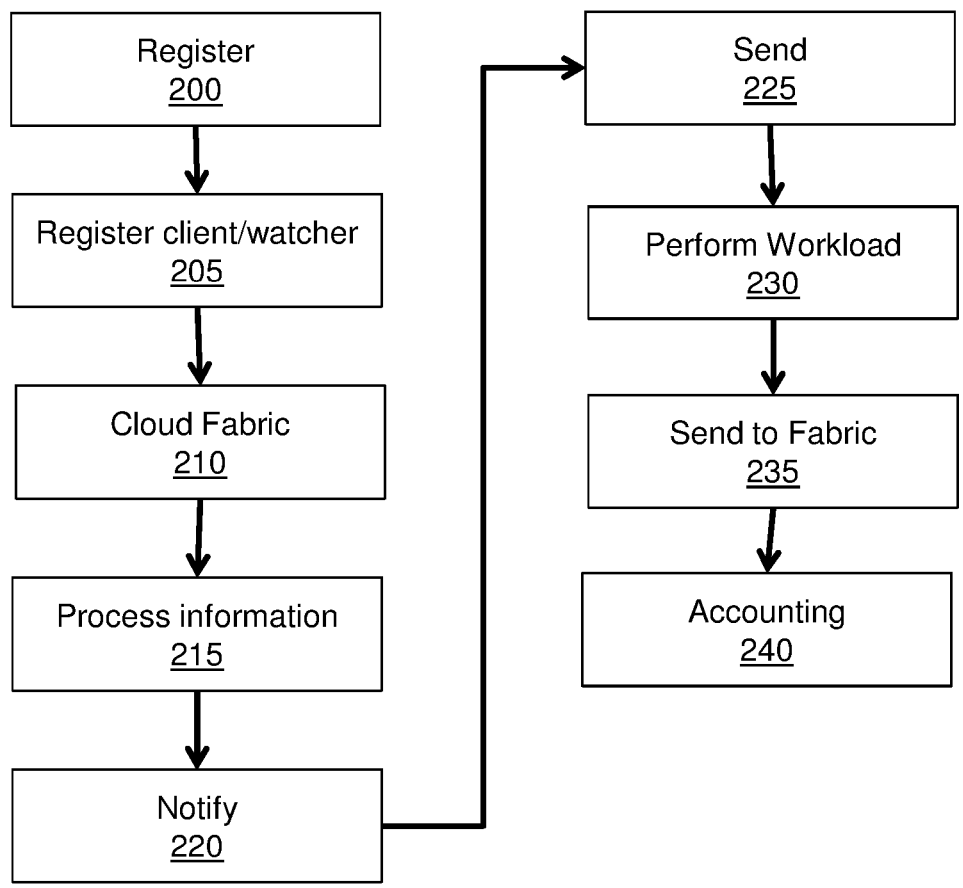
FIG. 2 shows an exemplary flow in accordance with aspects of the invention.
Figure 3:
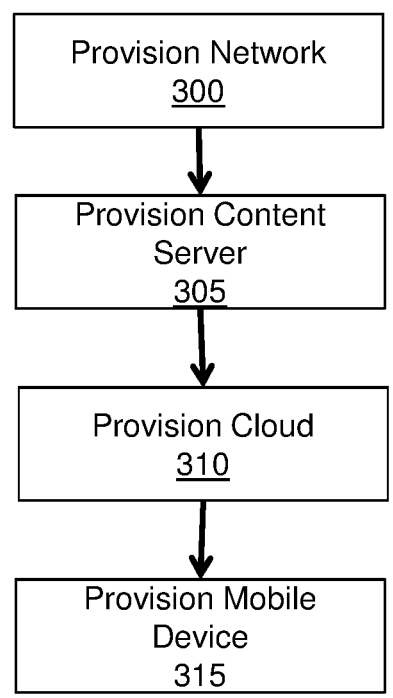
FIG. 3 illustrates a high level block diagram and/or process flow in accordance with aspects of the invention.

FIGS. 2 and 3 show exemplary flows for performing aspects of the present invention. The steps of FIGS. 2 and 3 may be implemented in the environment of FIG. 1, for example. The flow diagrams may equally represent a high-level block diagram or a swim-lane diagram of the invention. The flowchart and/or block diagrams in FIGS. 2 and 3 (and any other flowcharts and/or block diagrams) illustrates the architecture, functionality, and operation of possible implementations of systems, methods and computer program products according to various embodiments of the present invention. In this regard, each block in any of the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 2 depicts an exemplary flow for a process in accordance with aspects of the present invention. The flow process of FIG. 2 may be performed over several players (actors) such as, for example, a mobile device, a presence server (A/S)/IMS network, content download server, application server and a cloud fabric. More specifically, at step 200, the mobile device registers with the network using standard IMS semantics via a SIP Registration. This process step assumes the usual IFC (Initial Filter Criteria) process with the IMS core; although, other implementations are contemplated by the present invention.

At step 205, the mobile device registers with the presence server (A/S) as a client. The mobile device can also register as a watcher for incoming cloud changes. The mobile device sends registration information (SIP Publish) to the presence server A/S. This information may include, for example, any combination of device status, applications running, utilization information, time of day availability and/or other such information including location and presence. The information can be packaged into a standard presence document, which the presence server (A/S) is capable of interpreting the information.

At step 210, the mobile device information is sent to the cloud fabric by the presence server (A/S). At step 215, the cloud fabric processes this information to use as a basis for future decisions, e.g., workload management. The mobile device can also periodically send state changes to the cloud fabric via the presence server (A/S). An example of a state change could be "turn on airplane mode for a period of time" or utilization has dropped below a certain critical point. Other examples, which should not be considered limiting features, include data radio turned on, or geographic location entered (e.g., user is at home and device will be idle). At step 220, the presence server (A/S) notifies the cloud fabric about these changes (changes in the presence document essentially)

At step 225, the cloud fabric sends a workload request to the mobile device, which is sent in the form of a presence notification to the mobile device. Simultaneously, processing instructions and content are uploaded by the cloud fabric to a content cache (e.g., at a content download server) on the edge of the network. At step 230, the mobile device performs computing work after downloading anything it may need from the content cache. Upon termination or conclusion, results go back to the cloud fabric (if necessary via the presence server (A/S) (state changes) or via the content cache) and the cloud fabric may initiate dissociation of the mobile device, at step 235. At step 240, accounting records as necessary are generated and maintained. The cloud can then revert back to its original state. In this way, the there is an increase in the efficiency of clouds by allowing for adhoc leveraging of computing power in nodes (mobile devices) that are not formally part of the cloud.

In FIG. 3, steps are shown for the provisioning of the mobile device into the cloud fabric and the telecommunications IMS network. In embodiments, the provisioning process can be carried out using a provisioning workflow. For example, at step 300, the network is provisioned as any SIP device would be, in the Home Subscriber Server (HSS) and the IP Multimedia Subsystem (IMS) network. In addition, specific information for using the presence server can be provisioned using existing IMS provisioning semantics. At step 305, the content service is pre-provisioned with specific context and data that the cloud clients may require. At step 310, the cloud fabric is provisioned with all the details of the mobile device, such as its capabilities, specific availability times, processing information, processing threshold, etc. At step 315, the mobile device is provisioned with a lightweight presence client that can use the IMS stack found on mobile platforms. The client periodically communicates with the presence server A/S in the network and the cloud fabric and content server(s) as necessary.

Architecture of the Present Invention

Figure 4:
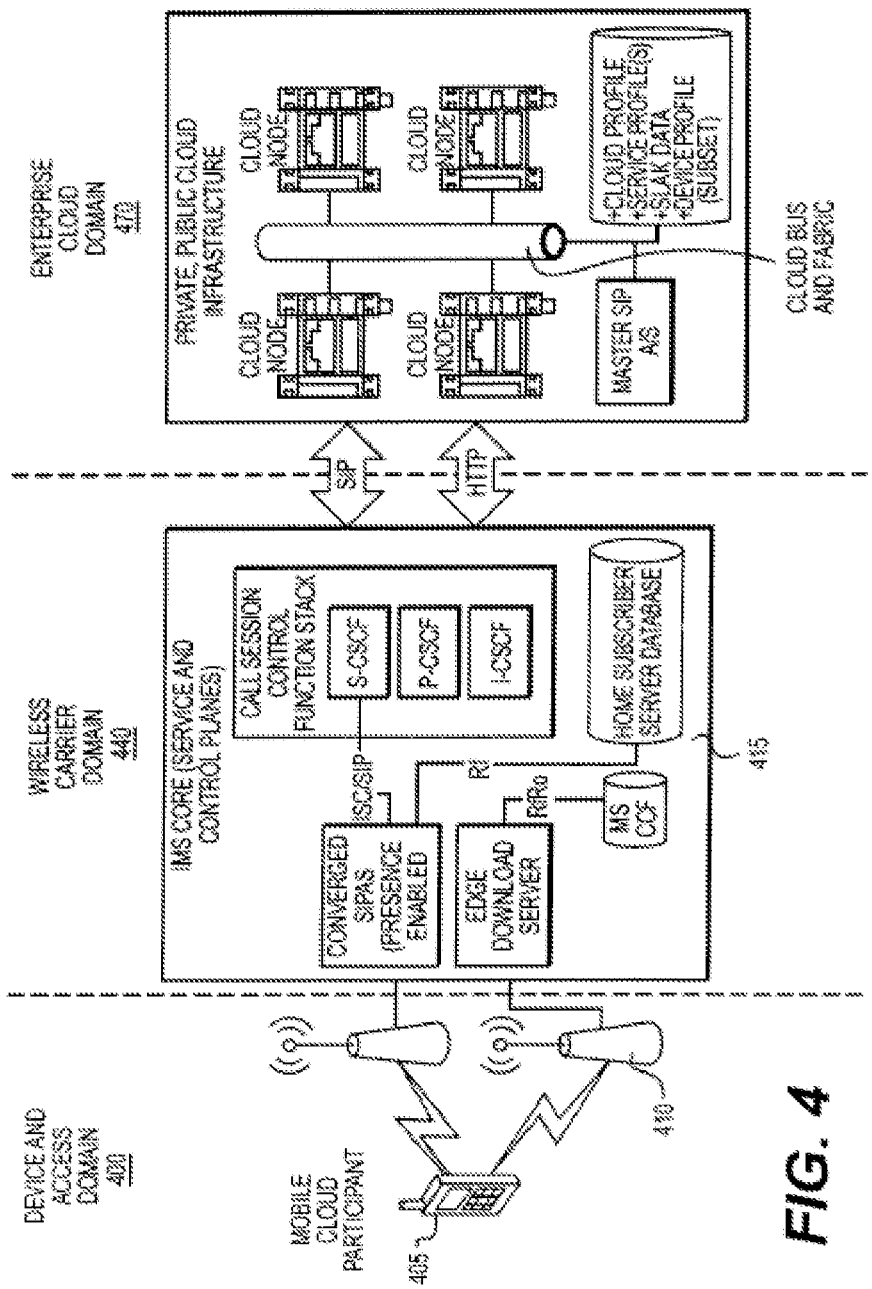
FIG. 4 shows an architecture overview in accordance with aspects of the invention.

FIG. 4 shows the architecture overview of the present invention. In particular, FIG. 4 shows a device and access domain 400, a wireless carrier domain 440 and an enterprise cloud domain 470. The device and access domain 400 includes a mobile device 405 (e.g., cloud participant) and network antennae 410, for example. The wireless carrier domain 440 includes an IMS core 415. The IMS core 415 may include, for example, a home subscriber server database, a call session control function stack, as well as a edge download server and a converged SIP A/S module. The enterprise cloud domain 470 includes a private public cloud infrastructure 475, which may include a cloud bus fabric between a plurality of cloud nodes, and a database having, for example, a cloud profile, service profile, device profile and state data, all of which were discussed above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method executable by a computing device comprising:
   receiving registration information of a mobile device with a IP multimedia subsystem (IMS) network using IMS semantics via a Session Initiation Protocol (SIP) registration process;
   receiving the registration information of the mobile device with a presence server using information packaged in a presence document, wherein the presence document comprises device status and presence of the mobile device;
   processing the presence document at a distributed network for future workload management decisions;
   managing workload for distributed network computing by utilizing the processed presence document to determine whether the mobile device is available to process the workload;
   sending, via the IMS network using SIP, a workload request in the form of a presence notification to the mobile device based on the registration with the IMS network, wherein the presence notification includes data for retrieving the workload and provides for ad hoc leveraging of computing power from the mobile device, which was not formally part of the distributed network prior to receiving the presence notification;
   providing instructions and content for the workload to the mobile device, based on the workload request, for assisting in the distributed network computing; and
   performing the workload on the mobile device after the providing the workload to the mobile device.

2. The method of claim 1, further comprises registering the mobile device as a watcher for incoming cloud changes with the presence server.

3. The method of claim 1, wherein the presence document further comprises at least one of applications running, utilization information, time of day availability, and location.

4. The method of claim 1, further comprising sending the registration information received by the presence server to the distributed network for processing the future workload management decisions.

5. The method of claim 1, further comprising periodically receiving state changes of the mobile device via the presence server.

6. The method of claim 1, further comprising sending the workload request to the mobile device via a cloud server which is coupled to the presence server and the IMS network.

7. The method of claim 6, further comprising simultaneously sending the workload request to the mobile device and uploading the instructions and content by the distributed network to a storage device.

8. The method of claim 7, further comprising uploading the instructions and content for the workload from the storage device to the mobile device for performing the workload.

9. The method of claim 1, further comprising initiating dissociation of the mobile device from the distributed network.

10. The method of claim 1, wherein the managing of the workload includes ad hoc leveraging of computing power using at least one mobile device which is not formally part of the distributed network computing.

11. The method of claim 10, wherein the managing of the workload includes using telecommunications based signaling to transfer workloads to the at least one mobile device that is tethered to the distributed network computing in an intermittently or constantly connected fashion.

12. The method of claim 1, further comprising dissociating the mobile device from the distributed network computing by leveraging IMS network based SIP.

13. The method of claim 1, wherein the workload management works across IP and SS7 telecommunications networks.

14. The method of claim 1, wherein a plurality of mobile devices are registered with the IMS network and the presence server, the method further comprising factoring in location and time of day intervals to determine and provide priority to at least one of the plurality of mobile devices that will assist in the workload management.

15. The method of claim 14, further comprising using network housed presence server points to initiate interactions between the distributed network computing and the at least one of the plurality of mobile devices.

* * * * *